United States Patent [19]

Inui et al.

[11] Patent Number: 4,772,799
[45] Date of Patent: Sep. 20, 1988

[54] OPTICAL COMMUNICATION SYSTEM

[75] Inventors: Syuji Inui; Makoto Kanai; Toshinori Takahashi, all of Aichi, Japan

[73] Assignee: Toyoda Gosei Co., Ltd., Nishikasugai, Japan

[21] Appl. No.: 936,506

[22] Filed: Dec. 1, 1986

[30] Foreign Application Priority Data

Nov. 30, 1985 [JP] Japan .................. 60-185136[U]
Nov. 30, 1985 [JP] Japan .................. 60-185137[U]

[51] Int. Cl.$^4$ .................................................. G02B 27/00
[52] U.S. Cl. ...................................... 250/551; 455/602
[58] Field of Search ................. 250/551, 227, 205; 455/602, 618, 613; 340/54, 22, 531

[56] References Cited

U.S. PATENT DOCUMENTS

| | | | |
|---|---|---|---|
| 3,541,341 | 11/1970 | Leete | 250/551 |
| 4,336,461 | 6/1982 | Ida | 250/551 |
| 4,456,903 | 6/1984 | Kishi et al. | 455/602 |
| 4,672,214 | 6/1987 | Takahashi et al. | 250/551 |

FOREIGN PATENT DOCUMENTS 0216338 12/1984 Japan ................................. 455/602

OTHER PUBLICATIONS

Frenzel, Louis E., "Optocoupler Converts AC Tone to Digital Logic Levels", *Electronics*, 7/75, p. 95.

Primary Examiner—David C. Nelms
Assistant Examiner—Michael Messinger
Attorney, Agent, or Firm—Cushman, Darby & Cushman

[57] ABSTRACT

A steering wheel equipped with an optical communication mechanism for allowing optical communication between the interior of the steering wheel or the steering wheel and a vehicle column with at least two light emitting elements for forming a redundant system by simultaneously emitting common optical signals and at least one light receiving element for receiving the optical signal.

5 Claims, 4 Drawing Sheets

OPTICAL COMMUNICATION SYSTEM

BACKGROUND OF THE INVENTION

This invention relates to a steering wheel and more particularly to a steering wheel equipped with an optical communication mechanism for allowing optical communication between the interior of the steering wheel or the steering wheel and a vehicle column.

Experiments are being conducted for providing the pad of a steering wheel with constant-speed traveling and communications apparatus switches, radio and head lamp switches, as well as a horn switch and electronic equipment such as a sound emitter and a display unit. Some of these have already been put to practical use.

A means for transmitting and receiving signals is essential to operating such electronic equipment fitted to the pad. When a steering wheel whose pad is not revolved when the steering wheel is actuated, a signal must be exchanged between the pad and column sides of a boss plate within the steering wheel. When ordinary steering wheel whoe pad is revolved is actuated, a signal must be exchanged between the steering wheel and the vehicle column.

Optical communication is one of the effective means for transmitting and receiving signals. Conventional optical communications include the following types. For a steering wheel whose pad is not revolved, at least one pair of light emitting elements and another pair of light receiving elements are installed separately opposite to one another to form more than one optical signal channel. This is necessary because one optical signal channel may be cut off. With this embodiment one optical signal channel is always usable (e.g., Japanese Patent Application (OPI) 69144/83).

for a steering wheel whose pad is revolved, a plastic photoconductive ring for conducting light from one element to another element is necessary because a light receiving (or emitting) element installed in the vehicle column is allowed to revolve on a light emitting (or receiving) element installed in the steering wheel (e.g. U.S. Pat. No. 4,456,903).

Although the prior art described above is intended to make optical communication possible at all times, the life of the parts in steering wheels used for optical communication has been not taken into consideration.

In other words, it is desired to take the life of light emitting elements into consideration when a steering wheel is put to practical use for optical communication. A light emitting diode (LED) is often employed as a light emitting element but the quantity of light to be emitted therefrom tends to attenuate gradually as time elapses.

If the quantity of light is largely attenuated because of long-term service, optical communication may be stopped and this will cause various types of equipment such as a radio, communication equipment or the like to malfunction. The quantity of light emitted from each light emitting element may attenuates to the extent that the quantity of light emitted from one of them is insufficient to maintain optical communication, provided that the light emitting element is of the type whose life is short, that it is operated under conditions detrimental to its life or that it is used for a long period of time.

Because of variations in the performance of the light emitting element, the quantity of light emitted from a particular one may quickly attenuate.

SUMMARY OF THE INVENTION

The present invention is intended to solve the above problems and it is therefore an object of the invention to provide a steering wheel with an optical communication mechanism which allows optical communication between the interior of the steering wheel or the steering wheel and a vehicle column through at least two light emitting elements which form a redundant system by simultaneously emitting common optical signals and at least one light receiving element for receiving the optical signals.

The two at least light emitting elements simultaneously emit common optical signals and the light receiving element simultaneously receives the optical signals from the light emitting elements in the normal state of use to ensure the performance of optical communication.

This overcomes the problem that the quantity of light may gradually attenuate because the light emitting element can deteriorate as time elapses.

Since at least two light emitting elements for emitting common optical signals are installed and the quantity of light emitted from each of them is added together, the one which is less attentuated compensates for the attenuation of the other. In consequence, the quantity of light obtained is sufficient to keep optical communication.

In other words, the at least two light emitting elements for simultaneously emitting the common optical signals act as a redundant system in optical communication.

BRIEF DESCRIPTION OF THE DRAWINGS

The accompanying drawings illustrate a steering wheel embodying the present invention.

DETAILED DESCRIPTION OF THE PREFERRED EMBODIMENT

Referring now to the accompanying drawings, the preferred embodiment of the present invention applied to an automobile steering wheel with a non revolving will now be described.

Figure 1:
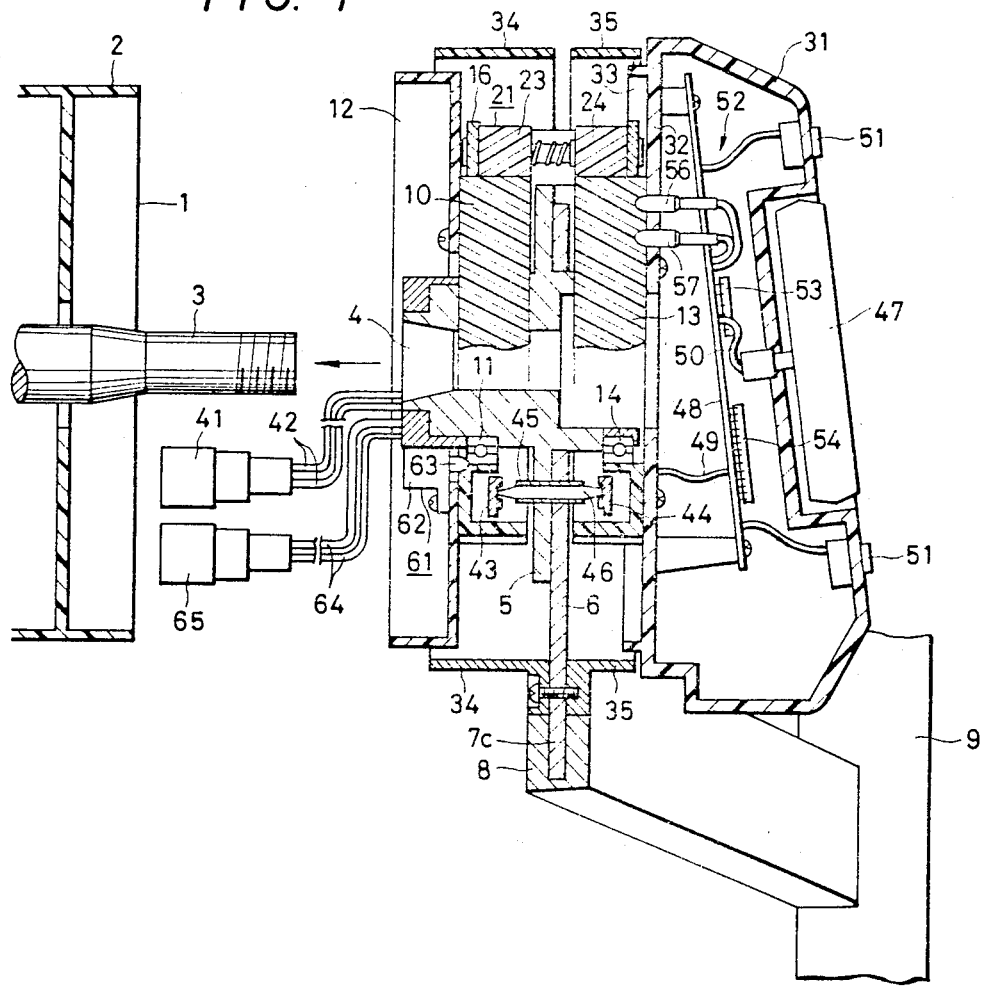
FIG. 1 is a sectional view of the steering wheel.

FIG. 1 illustrates mating projection 2 provided on the whole outer edge at the front end of an automobile column 1. A steering shaft 3 is passed through column 1. A steering wheel embodying the present invention is assembled to fit to the front end of column 1.

Roughly cylindrical boss 4 is fitted at the front end of the steering shaft 3 and clamped to the steering shaft 3 with a nut (not shown). On the outer periphery of boss 4 is flange 5 incorporated therein and boss plate 6 is fixed to flange 5 with a screw or welded thereto.

Figure 2:
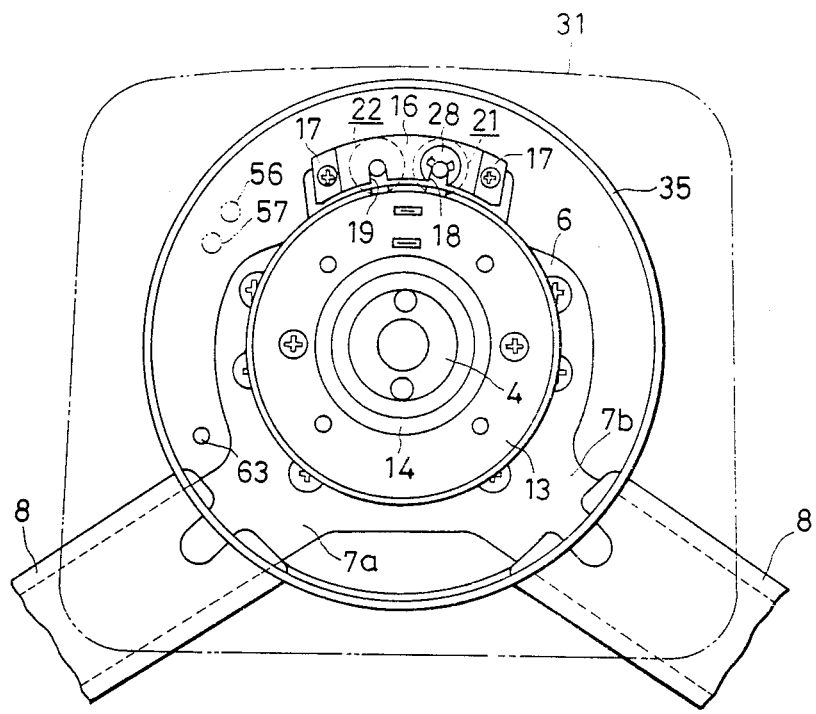
FIG. 2 is an elevational view partially showing the embodiment excluding a pad.

As shown in FIG. 2, mandrel 7a of a first spoke means and mandrel 7b of a second spoke means are incorporated in the left and right lower portions of boss plate 6, respectively. Moreover, the perimeters of a mandrels 7a, 7b of the spoke means are covered with covering material of urethane resin or the like. Ring means 9 as shown in FIG. 1 is supported at the front ends of mandrels 7a, 7b thereof. A column side sun gear (also called a central gear) 10 of synthetic resin is relatively rotatably fitted to the outer periphery on the column side of the boss 4 through a bearing 11. A helical gear is formed on column side sun gear 10. A light receiving base 12, also shown in FIG. 3 formed with a discoidal plastic plate having a brim, is fitted to the rear face of column side sun gear 10 with a screw mated with mating projection 2 and fixed to column 1 so that is is incapable of revolving thereon. Accordingly, column side sun gear 10 is also incapable of revolving on column 1 after being fitted thereto.

A pad side sun gear 13 of synthetic resin, shown in FIGS. 1 and 2 is fitted to the outer periphery on the pad side of boss 4 through bearing 14. A helical gear having the same diameter, the same number of teeth and the same tilted direction as those of column side sun gear 10 is formed on pad side sun gear 13.

Figure 4:
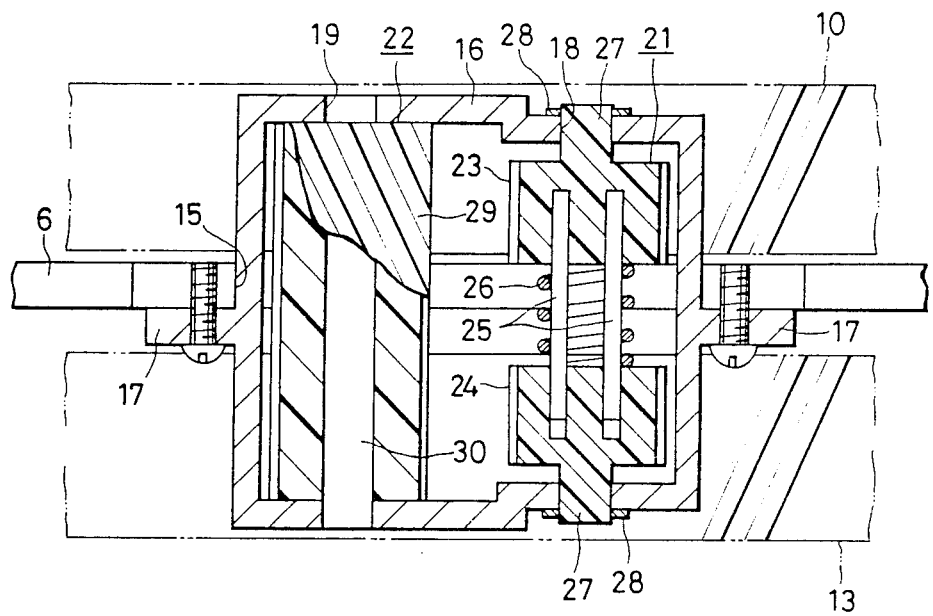
FIG. 4 is a sectional view of the principal portion showing a planet gear mechanism.

FIGS. 2 and 4 show a square framelike bearing member 16 of hard synthetic resin arranged in recess 15 formed on the upper outer periphery of boss plate 6 and fitting projections 17 projected from the left and right portions of bearing member 16 are fixed to boss plate 6 with screws. A pair of slide bearings 18, 19 are concavely installed on the bearing member 16 and a planet member 21 having an energizing means is rotatably installed on the one slide bearing 18, whereas a planet member 22 without energizing means is also rotatably installed on the other slide bearing 19.

FIG. 4 shows that the planet member 21, having the energizing means, consists of column and pad side planet gears 23, 24 each which is a helical gear of synthetic resin having the same diameter and the same number of teeth. Planet gears 23 and 24 respectively, engage the above column and pad side sun gears 10 and 13. Two connecting shafts 25, slidably inserted in both planet gears 23 and 24, and a spring 26 for energizing both planet gears 23 and 24 in a direction so that they drift away from each other on the outer periphery of connecting shaft 25. Moreover, a support shaft 27 incorporated in planet gears 23 and 24 is pivotally supported by slide bearing 18 and an E ring is fitted into support shaft 27.

Consequently, the column and pad side planet gears 23 and 24 simultaneously rotate on their axes and revolve on the sun gears 10, 13 respectively. At the same time, they energize the helical gears in the axial direction to cause the tooth faces to contact under pressure so that a backlash between gears 10 and 23 and gears 13 and 24 can be suppressed.

Planet member 22, without the energizing means, has a helical gear of synthetic resin consists of a long planet gear 29 which simultaneously engages both sun gears 10 and 13 and a support shaft 30 installed in the planet gear 29. Planet member 22 is used not only to rotate on its axis or revolve on the sun gears 10 and 13, but also to prevent sun gears 10 and 13 from rotating by means of the energizing force of the spring 26. If only planet member 21 having the energizing means is installed, sun gears 10 and 13 will be rotated by the component of the energizing force of the spring 26 and allowed to run away. Planet gears 23, 24 therefore would fail to press sun gears 10 and 13 and thus suppress a backlash.

Figure 3:
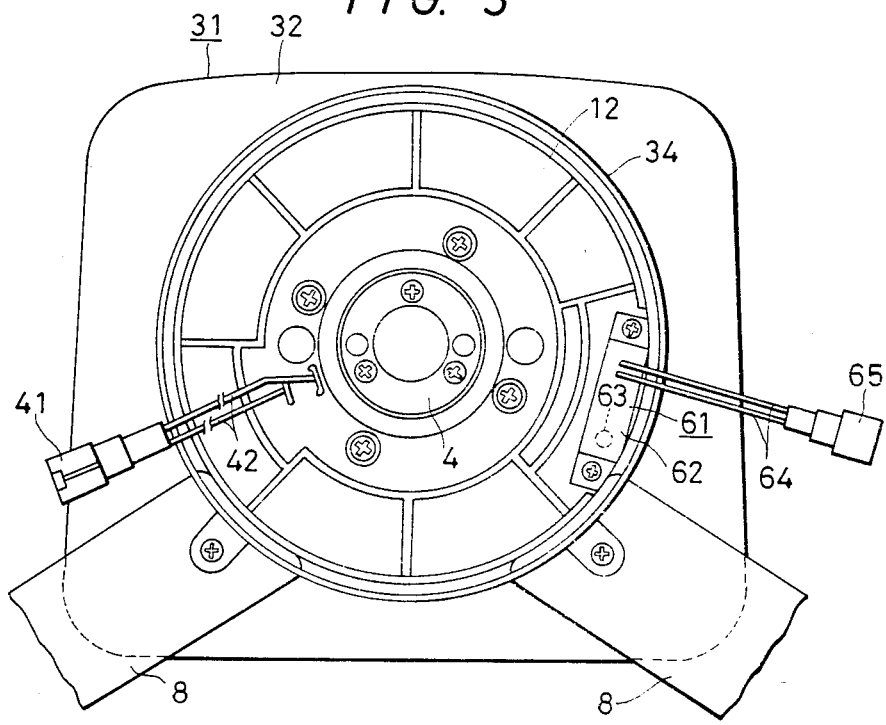
FIG. 3 is a rear elevational view thereof.

The rear plate, i.e., pad base 32 of boxlike pad 31 shown in FIGS. 1 and 3 is fixed to the front edge face of pad side sun gear 13. FIG. 1 shows projection 33 for preventing dust and light from penetrating in the pad provided at the outer edge on the rear face of pad base 32.

A cylindrical column side cover 34 and a cylindrical pad side cover 35 are so arranged and fixed to mandrels 7a, 7b of the spokes with screws on the column and pad sides of boss plate 6 as to surround sun gears 10 and 13 with a fixed space apart therefrom but not to contact planet members 21, 22.

The rear end of column side cover 34 and the front end of pad side cover 35 are respectively superposed on the outer peripheries of light receiving base 12 and projection 33 of pad base 22 with a small space apart therefrom so that dust and light are prevented from penetrating therein further.

The inner peripheral faces of column side cover 34 and pad side cover 35, the front face of light receiving base 12 and the rear face of pad base 32 are painted white to diffuse light.

A slip ring mechanism and an optical communication mechanism installed within the steering wheel will now be described.

FIGS. 1 and 3 show power supply connector 41 coupled to a connector (not shown) and leads 42 in column 1 are extended back from light receiving base 12, leads 42 being connected to column side slip ring 43 fitted in column side sun gear 10. Moreover, pad side slip ring 44 is fitted in pad side sun gear 13.

An insulating sleeve 45 of synthetic resin is inserted into and fixed to boss plate 6. Contact pin 46, for contacting and electrically conducting both slip rings 43 and 44, is slidably fitted in sleeve 45.

Leads 49 and 50 are connected between pad side slip ring 44 and horn switch 47 of a klaxon installed on the front face of pad 31 and a circuit board 48 installed in pad 31, so that power is supplied to horn switch 47 and circuit board 48.

Figure 5:
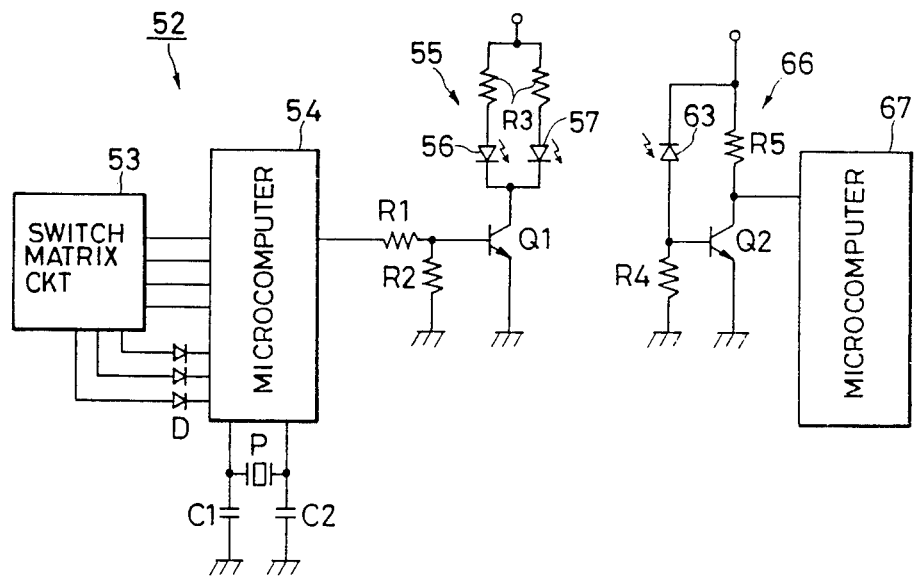
FIG. 5 is an electric circuit diagram for an optical communication mechanism.

On the front face of pad 31 are a plurality of switches 51, in addition to the horn switch 47, for operating a constant-speed travel unit, a communication apparatus, a radio and a head lamp (further, electronic equipment such as a sound emitter and a display unit which are not shown). Each of the switches 51 is connected to a transmitter 52 installed in pad 31. The transmitter 52 consists of, as shown in FIG. 5, a switch matrix circuit 53, a microcomputer 54 and a driving means 55.

The switch matrix circuit 53 is designed to convert the ON-OFF operations of the plurality of switches 51 into a matrix to make them conform to the microcomputer 54 and connected directly or indirectly through a diode D to the microcomputer 54, depending on the signal transmitting and receiving direction.

The microcomputer 54 is arranged to produce pulse signal voltages having different time lengths and pulse codes depending on the kinds of switches 51 or the combination thereof. The clock frequency of the microcomputer 54 is given by a quartz oscillator P whose terminals each are grounded through capacitors C1, C2.

Driving means 55 consists of signal series resistor R1 and input resistor R2 connected to the pulse signal output terminal of microcomputer 54, a transistor Q1 with the grounded emitter and the base connected to the input resistor R2, two light emitting elements 56 and 57 connected in parallel with the collector, and resistors R3 for controlling collector current. Long-life infrared light emitting diodes (such as those made by Matsushita Electric Ind. Co.: Model LN 66) have been employed as the light emitting elements 56 and 57 in this embodiment. A power supply voltage of 5 V is applied to resistors R3 of driving means 55, so that a current of about 60 mA at a peak pulse is allowed to flow through each of the light emitting elements 56 and 57.

Accordingly, the two light emitting elements 56 and 57 are driven in parallel in the collector of the transistor Q1 and used to form a redundant system by simultaneously emitting common optical signals.

Moreover, the two light emitting elements 56 and 57 are fitted to the pad base 32 in such a manner as to be exposed to the rear side thereof and the position in which it is fitted is, as shown in FIG. 2, located directly above on the left of the boss plate 6 when steering wheel is in the neutral position.

The two light emitting elements 56 and 57 are arranged close to each other and the space between them is smaller than the width of the mandrels 7a, 7b, of the spokes. Accordingly, both the light emitting elements 56, 57 are simultaneously covered by mandrels 7a, 7b of the spokes as ring 9 revolves.

The inner peripheral faces of column and pad side covers 34 and 35, the front face of light receiving base 12 and the rear face of pad base 32 constitute a space and the optical signal emitted from each of light emitting elements 56 and 57 is widely diffused in that space.

FIG. 3 illustrates a light receiving member 61 for receiving the optical signals from the two light emitting elements is fitted to the light receiving base 12 and consists of a case 62 and a light receiving element 63 fitted to the front face of case 62 so as to be exposed to the front side of the light receiving base 12. A photodiode without a life problem has been employed as light receiving element 63.

Light receiving element 63 is arranged to be located directly above mandrel 7a of the first spoke when the steering wheel is in the neutral position.

A lead 64 and a signal connector 65 respectively connected to the light receiving element 63 are extended back from the case 62 and the connector 65 is connected to a signal connector (not shown) in the column.

In the light receiving member 61, an amplifier circuit 66 as shown in FIG. 5 consisting of a series resistor R4, a transistor Q2 with the grounded emitter and a collector resistor R5 and a waveform rectifier circuit (not shown) are connected to the light receiving element 63. A microcomputer for demodulation is connected to the amplifier circuit 66 and various kinds of equipment such as a radio and a communication apparatus are further connected thereto.

In the embodiment thus arranged, the effect of the invention will be described.

The steering wheel is first fitted to the column 1 and the power supply connector 42 and the signal connector 65 are also connected to the connector in the column.

When the ring 9 is revolved to operation the steering wheel, the planet gears 23, 24, 29 are revolved around the column and pad side sun gears 10, 13 while being rotated on axes, respectively. Since the column side sun gear 10 is not allowed to revolve around the column 1, the pad side sun gear 13 is also not allowed to revolve around the column 1. At this time, a backlash between gears is thus prevented.

When the switch 51 in the pad 31 turned on, the transmitter 52 produces pulse signal voltages different in time lengths and pulse codes depending on the kinds of switches 51 and the combination thereof. The transistor Q1 in driving means 55 changes the collector current according to the pulse signal, whereby the two light emitting elements 56 and 57, connected in parallel, are caused to emit common optical signals simultaneously.

The optical signal emitted from each of the light emitting elements 56 and 57 is widely diffused in the space constituted by the inner peripheral faces of the column and pad side covers 34 and 35, the front face of the light receiving base 12 and the rear face of the pad base 32. Since each of the above faces is painted white, the attenuation of the optical signal thus diffused is minimized.

The optical signal thus diffused is made to arrive at the light receiving element 63 directly or in a roundabout way, irrespective of the revolving positions of the mandrels 7a and 7b. In other words, since the light emitting elements 56 and 57 are covered simultaneously with each of the mandrels 7a and 7b of the spokes, the light emitting elements 56 and 57 may not directly face the light receiving element 63. The optical signal is then allowed to enter the light receiving element 63 in a roundabout way.

The light receiving element 63 is therefore capable of receiving the optical signals from the two light emitting elements 56 and 57 and the signal received is supplied to amplifier circuit 66. Amplifier circuit 66 amplifies the weak electric signal from the light receiving element 63, whereas the microcomputer 67 demodulates the amplified signal to control the operation of the radio, the communication apparatus and other kinds of equipment.

During the normal state of use, the two light emitting elements 56 and 57 thus simultaneously emit the common optical signals respectively and the one light receiving element 63 also simultaneously receives the optical signals to ensure the performance of optical communication.

Since the light emitting elements 56, 57 deteriorate as time elapses, the quantity of light gradually decreases. When the light emitting elements 56, 57 have short life or they are operated under conditions detrimental to their life (these conditions have been taken into consideration according to the present invention), or they are used for a long period of time, the quantity of light emitted from one of the light emitting elements 56 and 57 may become insufficient to keep up optical communication.

Moreover, variations of the light emitting elements 56 and 57 may cause the quantity of light emitted from one of them to quickly attenuate.

Even in the above case, the two light emitting elements 56 and 57 for emitting the common optical signals allows the addition of the quantity of light emitted therefrom and one of them to compensate for the decreased quantity of light emitted from the deteriorated light emitting element, so that the quantity of light sufficient to maintain optical communication as a whole.

In other words, light emitting elements 56 and 57 for simultaneously emitting the common optical signals act as a redundant system in optical communication.

Even though the light emitting elements 56, 57 deteriorate as time elapses, optical communication can be maintained and therefore each apparatus is prevented from malfunctioning because of the interruption of optical communication.

Another embodiment of the invention can be so arranged that at least one of the light emitting elements is capable of providing a predetermined current large enough to keep up optical communication, whereas at least the other is made to provide a current smaller than the predetermined one.

In the normal state of use, the at least two light emitting elements are caused to simultaneously produce the common optical signals. One light emitting element is given the predetermined current capable of generating the predetermined quantity of light sufficient to maintain optical communication at all times, whereas the other is given the current smaller than the predetermined current and produces a quantity of light insufficient for optical communication.

The quantity of light emitted from the latter light emitting element is such that it allows optical communication under a particular condition that no shelter exists between the light emitting and receiving elements and optical communication is not always possible.

However, the light receiving element simultaneously receives the common optical signals and consequently receives the combination of optical signals one which has the predetermined quantity of light necessary for optical communication and one which has less than the predetermined one to ensure optical communication.

Figure 6:
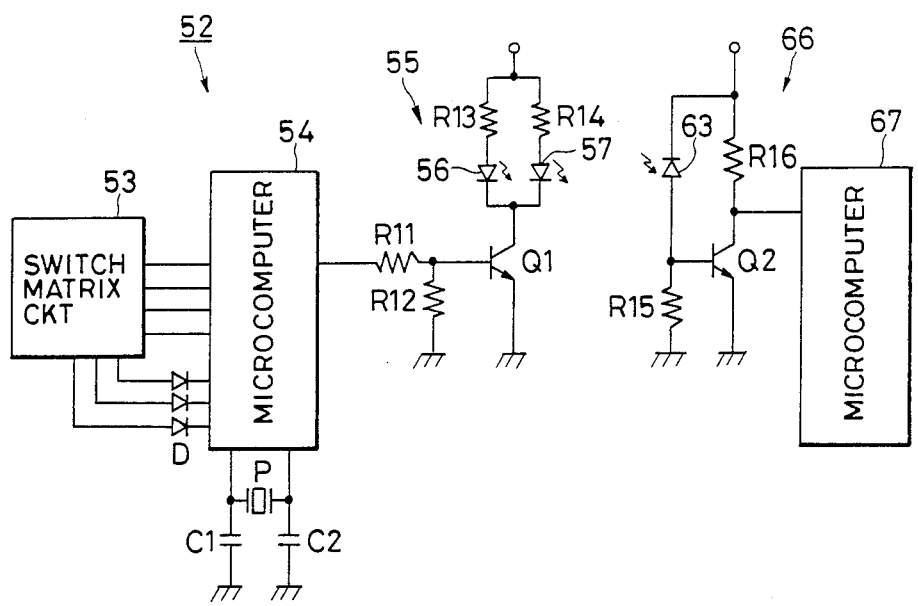
FIG. 6 is an electric circuit diagram for another optical communication mechanism embodying the present invention.

FIG. 6 is an electric circuit diagram for the optical communication mechanism of this embodiment.

A driving means 55 consists of a signal series resistor R11 and an input resistor R12 respectively connected to the pulse signal output terminal of a microcomputer 54, a transistor Q1 with the grounded emitter and the base connected to the input resistor R12, two light emitting elements 56 and 57 connected to the collector in parallel, resistors R13 and R14 respectively connected to the light emitting elements 56 and 57 and used for controlling collector current.

Resistor R13 for controlling current in one light emitting element 56 has a resistance of 51, whereas resistor for R14 controlling current in the other has a resistance of 100. A supply voltage of 5 V is applied to the resistors R13 and R14.

The two light emitting elements 56 and 57 are driven in parallel in the collector of the transistor Q1 and so arranged as to emit common optical signals with different quantities of light.

In other words, a predetermined current of about 60 mA at a pulse peak is made to flow through one of the light emitting elements so that the predetermined quantity of light allowing optical communication at all times may be generated for the light receiving element 63 as described later.

Moreover, a current of about 30 mA, at the peak which is smaller than the predetermined current is supplied to the other light emitting element 57.

Of the light emitting elements, what has been supplied with the predetermined current 56 is capable of producing the predetermined quantity of light for optical communication toward the light receiving element and the other 57 given the current smaller than the predetermined current produces the quantity of light less than the predetermined one.

In particular, the quantity of light emitted from the latter light emitting element 57 is such that it allows optical communication under a particular condition when no shelter such as the mandrels 7a, 7b of the spokes exist between the light emitting element 57 and the light receiving element 63. Optical communication is thus not always possible.

In the normal state of use, light emitting element 56 supplied with the predetermined current is capable of generating the predetermined quantity of light for maintaining the optical communication toward the light receiving element 63 at all times. However, the other supplied with the current smaller than the predetermined one produces the quantity of allowing the optical communication under a particular condition wherein no shelter exists between the light emitting and receiving elements 57 and 63.

Notwithstanding, the light receiving element 63 simultaneously receives the common optical signals from the light emitting elements 56 and 57 and therefore receives the combination of the optical signals having the predetermined quantity of the light and the quantity of light which is less than the predetermined one.

According to this embodiment, however, since the other light emitting element 57 is supplied with the current smaller than the predetermined one, the deterioration of this light emitting element 57 is halved compared with that of that light emitting element 56 and the light attenuation ratio become reducible.

Figure 7:
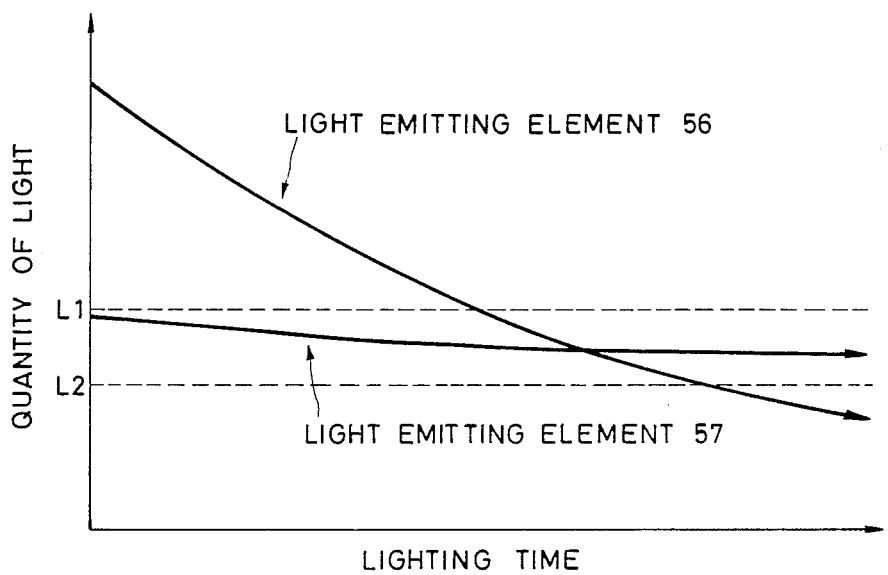
FIG. 7 is a graph showing variations with time in the light emitting elements according to the present invention.

FIG. 7 is a conceptive diagram showing reduction in the quantity of light in terms of variations with time. In FIG. 7, there are shown the predetermined quantity of light L1 and the minimum quantity of light L2 for optical communication when no mandrels 7a and 7b of the spokes exist between the light emitting elements 56 and 57 and the light receiving element 63.

Accordingly, even though the light emitting element 56 supplied with the reference current deteriorates for the above reasons, thus making the quantity of light smaller than the predetermined one L1, the light emitting element 57 is capable of compensating for the reduction in the quantity of light, whereby the quantity of light sufficient to keep up the optical communication as a whole.

Moreover, even though the light emitting element 56 supplied with the reference current produces the quantity of light less than L2, the light emitting element 57 supplied with the current less than the predetermined one maintains the quantity of light greater than L2. In consequence, optical communication becomes possible when no mandrels 7a and 7b of the spokes exist between at least the light emitting elements 56 and 57 and the light receiving element 63, i.e., when the automobile is moving straight ahead.

The present invention is not limited to the above arrangements and can be embodied as follows:

(1) The number of light emitting elements is not limited, provided there are at least two of them, because they are allowed to constitute a redundant system. In the vehicle steering wheel, however, two of them will be sufficient in view of life and economy.

(2) An arrangement of light emitting and receiving elements according to the above embodiments may be changed within the range of possible diffusion of an optical signal.

(3) Light emitting and receiving elements may be so arranged that not only one-way optical communication from the pad to column but also two-way communication is provided, i.e., the light emitting and receiving elements may be installed on the column and pad sides, respectively.

(4) A light emitting diode for emitting visible light or a laser other than an infrared light emitting diode is usable as a light emitting element. Moreover, a photodiode or phototransistor with a filter for cutting visible light other than an ordinary photodiode is also usable as a light receiving element.

When a combination of the infrared light emitting diode and the photodiode with a filter for cutting visible light is employed, a visible ray of light forming most part of disturbance light is cut and optical communication can be conducted with only infrared rays. Consequently, the influence of the normal disturbance light can be nullified.

(5) A mechanism for making the pad unrotatable is not limited to a planet gear as described above and, e.g., more than on fitting member (Japanese Patent Application (OPI) No. 145642/84) or a spiral member (Japanese Patent Application (OPI) No. 544/85) may be used to couple the column and the pad.

(6) A rotatable pad wherein the pad is rotable together with a ring may be applied to a steering wheel. In this case, light emitting and receiving elements are installed in the steering wheel and the vehicle column.

As set forth above, even though the light emitting element deteriorates as time elapses, optical communication can be maintained and various types of equipment are prevented from malfunctioning because of interruption of optical communication.

What is claimed is:

1. An optical communication system which allows optical communication even if an obstruction is present comprising:
   means for emitting a first optical signal having a magnitude which allows optical communication even if said obstruction prohibits the direct passage of said first optical signal;
   means for emitting a second optical signal having a magnitude which allows optical communication only if said obstruction does not prohibit the direct passage of said second optical signal;
   means for allowing the indirect transmission of said optical signals; and
   means for detecting said optical signals.

2. A device according to claim 1 further including:
   a microprocessor for outputting electrical signals which control said first and second optical signal emitting means; and
   a switch matrix for inputting switch position signals to said microprocessor.

3. An optical communications system for use in a steering wheel assembly having a steering wheel with a center pad covering a steering wheel interior, moving mandrels and a stationary steering wheel column comprising:
   means disposed in said interior of said steering wheel for emitting a first optical signal having a magnitude which allows optical communication even if said mandrels prohibit the direct passage of said first optical signal;
   means disposed in said interior of said steering wheel for emitting a second optical signal having a magnitude which allows optical communication only when said mandrels do not prohibit the direct passage of said second optical signal;
   means for allowing indirect transmission of said optical signals; and
   means diposed in said stationary steering wheel column for detecting said optical signals.

4. A device according to claim 3 further including:
   a microprocessor disposed in said interior of said steering wheel for outputting electrical signals which control said first and second optical signal emitting means; and
   a switch matrix disposed in said interior of said steering wheel for inputting switch position signals to said microprocessor.

5. The apparatus of claim 3, wherein said first and second optical signal emitting means are arranged close to each other.

* * * * *